(12) United States Patent
Stone (10) Patent No.: US 9,277,274 B2
(45) Date of Patent: *Mar. 1, 2016

(54) METHOD AND APPARATUS FOR FORWARDING TELEVISION CHANNEL VIDEO IMAGE SNAPSHOTS TO AN AUXILIARY DISPLAY DEVICE

(75) Inventor: Christopher J. Stone, Newtown, PA (US)

(73) Assignee: Google Technology Holdings LLC, Mountain View, CA (US)

( * ) Notice: Subject to any disclaimer, the term of this patent is extended or adjusted under 35 U.S.C. 154(b) by 451 days.

This patent is subject to a terminal disclaimer.

(21) Appl. No.: 12/895,069

(22) Filed: Sep. 30, 2010

(65) Prior Publication Data

US 2011/0072480 A1    Mar. 24, 2011

Related U.S. Application Data

(63) Continuation of application No. 10/246,337, filed on Sep. 18, 2002, now Pat. No. 7,831,992.

(51) Int. Cl.
*H04N 5/445* (2011.01)
*G06F 3/00* (2006.01)
(Continued)

(52) U.S. Cl.
CPC ... *H04N 21/440236* (2013.01); *H04N 5/44582* (2013.01); *H04N 21/4122* (2013.01); *H04N 21/4126* (2013.01); *H04N 21/435* (2013.01); *H04N 21/4355* (2013.01);
(Continued)

(58) Field of Classification Search
CPC .................. H04N 21/42204; H04N 21/42208; H04N 21/42209; H04N 21/4222

USPC .............................. 725/37, 39, 40, 51, 60–61
See application file for complete search history.

(56) References Cited

U.S. PATENT DOCUMENTS

| 4,959,810 A | 9/1990 | Darbee et al. |
| 5,003,396 A | 3/1991 | Kang |

(Continued)

FOREIGN PATENT DOCUMENTS

| EP | 1102494 A2 | 5/2001 |
| GB | 2343073 A | 4/2000 |

(Continued)

OTHER PUBLICATIONS

Office Action, Mexican App. No. 5002625; May 30, 2008.

(Continued)

*Primary Examiner* — Kyu Chae
(74) *Attorney, Agent, or Firm* — Morris & Kamlay LLP (57) ABSTRACT

A method of processing television content metadata in a communications system. The system includes a consumer device (e.g., a set-top box and/or television) in communication with an auxiliary display device (e.g., webpad). A broadcast television channel video image signal and the metadata are received by the consumer device. A single video image frame of the broadcast television channel video image signal is captured when a predefined indicator is detected in the metadata. The metadata is modified by changing the predefined indicator to an image identifier associated with the single video image frame. The single video image frame is converted to a well-known format, and the consumer device sends the modified metadata and the converted single video image frame to the auxiliary display device for display thereon.

12 Claims, 6 Drawing Sheets

(51) Int. Cl.
  *G06F 13/00* (2006.01)
  *H04N 21/4402* (2011.01)
  *H04N 21/41* (2011.01)
  *H04N 21/435* (2011.01)
  *H04N 21/462* (2011.01)
  *H04N 21/4722* (2011.01)
  *H04N 21/4782* (2011.01)
  *H04N 21/6547* (2011.01)
  *H04N 21/858* (2011.01)
  *H04N 5/44* (2011.01)

(52) U.S. Cl.
  CPC .. *H04N 21/440218* (2013.01); *H04N 21/4622* (2013.01); *H04N 21/4722* (2013.01); *H04N 21/4782* (2013.01); *H04N 21/6547* (2013.01); *H04N 21/858* (2013.01); *H04N 21/8586* (2013.01); *H04N 5/4448* (2013.01)

(56) References Cited

U.S. PATENT DOCUMENTS

| | | | |
|---|---|---|---|
| 5,282,028 A | | 1/1994 | Johnson et al. |
| 5,307,055 A | | 4/1994 | Baskin et al. |
| 5,406,558 A | | 4/1995 | Rovira et al. |
| 5,410,326 A | * | 4/1995 | Goldstein ................ 348/734 |
| 6,002,450 A | | 12/1999 | Darbee et al. |
| 6,025,837 A | | 2/2000 | Matthews, III et al. |
| 6,130,726 A | | 10/2000 | Darbee et al. |
| 6,154,204 A | | 11/2000 | Thompson et al. |
| 6,199,206 B1 | | 3/2001 | Nishioka et al. |
| 6,240,555 B1 | | 5/2001 | Shoff et al. |
| 6,263,501 B1 | | 7/2001 | Schein et al. |
| 6,349,410 B1 | | 2/2002 | Lortz |
| 6,496,122 B2 | | 12/2002 | Sampsell |
| 6,496,981 B1 | | 12/2002 | Wistendahl et al. |
| 6,678,462 B1 | | 1/2004 | Chihara |
| 6,732,373 B2 | * | 5/2004 | Harrison et al. ............ 725/141 |
| 6,785,902 B1 | | 8/2004 | Zigmond et al. |
| 6,791,620 B1 | | 9/2004 | Elswick et al. |
| 7,263,711 B1 | * | 8/2007 | Estipona ................ 725/112 |
| 7,263,712 B2 | * | 8/2007 | Spencer ................ 725/112 |
| 7,831,992 B2 | * | 11/2010 | Stone ................ 725/112 |
| 2001/0052133 A1 | | 12/2001 | Pack et al. |
| 2002/0033842 A1 | | 3/2002 | Zetts |
| 2002/0047899 A1 | | 4/2002 | Son et al. |
| 2002/0059650 A1 | | 5/2002 | Lyda |
| 2002/0095677 A1 | | 7/2002 | Davis et al. |
| 2002/0145752 A1 | | 10/2002 | Hanabusa et al. |
| 2002/0162118 A1 | | 10/2002 | Levy et al. |
| 2003/0070175 A1 | * | 4/2003 | Panabaker ................ 725/105 |
| 2004/0032348 A1 | * | 2/2004 | Lai et al. ................ 341/50 |
| 2011/0078745 A1 | * | 3/2011 | Macrae et al. ................ 725/60 |

FOREIGN PATENT DOCUMENTS

| | | |
|---|---|---|
| WO | 01/47256 A1 | 6/2001 |
| WO | 02/03705 A2 | 1/2002 |

OTHER PUBLICATIONS

Office Action, Mexican App. No. 5002625; Oct. 5, 2007.

\* cited by examiner

METHOD AND APPARATUS FOR FORWARDING TELEVISION CHANNEL VIDEO IMAGE SNAPSHOTS TO AN AUXILIARY DISPLAY DEVICE

CROSS-REFERENCE TO RELATED APPLICATION

This application is related to co-pending U.S. patent application Ser. No. 10/081,947, filed on Feb. 20, 2002, entitled "Method and Apparatus for Processing ATVEF Data to Control the Display of Text and Images."

BACKGROUND OF THE INVENTION

1. Field of the Invention

The present invention generally relates to the use and processing of interactive television data for delivering enhanced television programming in a CATV environment.

2. Background Information

The Advanced Television Enhancement Forum (ATVEF) was formed in 1997 by a consortium of 14 leading companies in the television and computing industries. This group developed a public, worldwide specification for creating and delivering interactive TV (ITV) content. In 1999, the ATVEF Specification v1.1, r26 was finalized and published. The ATVEF Specification serves as a standard for creating enhanced, interactive television content and delivering that content to a range of television, set-top, and PC-based receivers. The ATVEF Specification uses existing Internet technologies to deliver enhanced TV programming over both analog and digital video systems using terrestrial, cable, satellite and Internet networks. The ATVEF Specification can be used in both one-way broadcast and two-way video systems, and is designed to be compatible with all international standards for both analog and digital video systems.

Television enhancements are comprised of three related data sources: announcements (delivered via SAP), content (delivered via UHTTP), and triggers (delivered via the trigger protocol over UDP). SAP (Session Announcement Protocol) is a protocol used for session announcements. UHTTP (Uni-directional Hypertext Transfer Protocol) is a simple, robust, one-way resource transfer protocol that is designed to efficiently deliver resource data in a one-way broadcast-only environment. UDP (User Datagram Protocol) is an Internet Standard transport layer connection-less protocol which adds a level of reliability and multiplexing to IP. IP is one of the communication languages used by computers connected to the Internet. This resource transfer protocol is appropriate for Internet Protocol (IP) multicast over a television vertical blanking interval (VBI), IP multicast carried over MPEG, or other unidirectional transport systems. MPEG (Moving Picture Experts Group) is the name of a family of standards used for coding audio-visual information (e.g., movies, video, music) in a digital compressed format. The major advantage of MPEG compared to other video and audio coding formats is that MPEG files are much smaller for the same quality. This is because MPEG uses very sophisticated compression techniques.

In 1953, the NTSC (National Television Standards Committee) developed a set of standard protocols for television (TV) broadcast transmission and reception for use in the United States. An NTSC TV image has 525 horizontal lines per frame (complete screen image). These lines are scanned from left to right, and from top to bottom. Every other line is skipped. Thus, it takes two screen scans to complete a frame, one scan for the odd-numbered horizontal lines, and another scan for the even-numbered lines. Each half-frame screen scan takes approximately 1/60 of a second. A complete frame is scanned every 1/30 second. Each time the electron gun in the television's cathode ray tube finishes scanning a half-frame, it must return to the upper left hand corner of the television screen to prepare for the next half-frame. This takes a significant amount of time, so each pass of the electron gun must be synchronized with the incoming signal. This is done by adding a set of unused lines of data (exactly 21 lines) to the end of each screen scan, giving the electron gun time to return to its starting position. These 21 extra lines make up the VBI. The VBI of a television signal is a non-viewable portion of the television signal that can be used to provide point-to-multipoint IP data services and relieve congestion and traffic in the traditional Internet access networks. IP datagrams may be transmitted using the VBI of a television signal.

Only the first nine lines of the VBI are actually required to reposition the cathode ray. This leaves twelve more lines (10 through 21) that can be used to broadcast data. In the United States, closed captioning data is broadcast on VBI line 21. The transmission of multicast-IP using the North American Basic Teletext Standard (NABTS) is a recognized and industry-supported method of transporting data on the VBI. NABTS has traditionally been used on 525 line television systems such as NTSC.

The ATVEF Specification defines how ATVEF content is displayed and how the receiver is notified of new content. The ATVEF Specification also defines how content is delivered. Since a television or set-top terminal does not necessarily have a connection out to the Internet, the ATVEF Specification describes two distinct models for delivering content. These two content delivery models are commonly referred to as transports, and the two transports defined by ATVEF are referred to as transport type A and transport type B.

Transport type A is defined for ATVEF receivers that maintain a connection (commonly called a back-channel or return path) to the Internet. Transport A is for delivery of triggers by the forward path and the pulling of data by a (required) return path. Generally, this network connection is provided by a dial-up modem, but may be any type of bi-directional access channel. Transport type A is a method for delivering only triggers without additional content. Since there is no content delivered with Transport type A, all data must be obtained over the back-channel, using URLs passed with the triggers as a pointer to the content. ATVEF triggers are broadcast in line 21 of the VBI.

Transport type B provides for delivery of both ATVEF triggers and its associated content via the broadcast network. In this model, the broadcaster pushes content to a receiver, which will store it in the event that the user chooses to view it. Transport B uses announcements sent over the network to associate triggers with content streams. An announcement describes a content stream, and may include information regarding bandwidth, storage requirements, and language (enhancements may be delivered in multiple languages). Transport Type B uses VBI lines 10 through 20 to carry interactive television information, such as IP datagrams.

Thus, with the advent of ATVEF and digital cable TV, a new era in TV viewing experience is emerging in which video complementary data services are available to the TV viewer. There are many potential methods for experiencing these data services. One such way is to use a second display screen on an auxiliary display device. One example of an auxiliary display device is a webpad, which is a relatively small remote wireless device.

Auxiliary display devices are Internet compatible appliances that process and display ATVEF data. The auxiliary display devices are often required to display broadcast television channel video images in a designated area of the screen on the auxiliary display devices. The broadcast television channel video image is normally referred to for obtaining image map data, which defines how ATVEF data and broadcast television channel video images are to be displayed. Under certain circumstances, some auxiliary display devices are unable to access to the video image. Thus, an area of the screen designated for the broadcast television channel video image may not be available for use.

SUMMARY OF THE INVENTION

In today's cable television market, subscribers are provided with the opportunity to access enhanced video services. Typically, these enhancements include some type of television content metadata and/or IP/World Wide Web information transmitted by a video service provider to a set-top box (STB). The viewer is then allowed to select this metadata (enhanced information) using an auxiliary display device. The same auxiliary display device is used to control the selection of programming viewed on a television. The content metadata is displayed on a display of the auxiliary display device. The present invention enables a user of the auxiliary display device that processes the metadata, which is incapable of displaying a broadcast television channel video image, to view a "snapshot" of a broadcast television channel video image that is currently being supplied to the television by the STB. Otherwise, because the metadata allocates a portion of the display of the auxiliary display device to the video image, the allocated portion of the display would be blank.

The present invention includes a method of processing television content metadata in a communications system. A broadcast television channel video image signal and the metadata are received. A single video image frame of the broadcast television channel video image signal is captured when a predefined indicator is detected in the metadata. The metadata is modified by changing the predefined indicator to an image identifier associated with the single video image frame.

The communications system may include a consumer device in communication with an auxiliary display device. The consumer device may send the modified metadata and the single video image frame to the auxiliary display device for display thereon.

The consumer device may be a set-top box (STB) or a television. The predefined indicator may be a "tv:" uniform resource locator (URL). The metadata may include advanced television enhancement forum (ATVEF) data.

The single video image frame may be a Moving Picture Experts Group (MPEG) image frame, and the MPEG image frame may be converted to a Joint Photographic Experts Group (JPEG) image frame, a Tagged Image File Format (TIFF) image frame, a Graphic Interchange File Format (GIFF) image frame, a Portable Network Graphics (PNG) image frame, an Encapsulated PostScript File (EPSF) image frame, a bitmap graphics file image frame, or an object oriented graphics file image frame.

The communications system may include a multimedia processor. The multimedia processor may capture an analog video signal, convert the analog video signal to a single video image frame, and convert the single video image frame to one of the above-mentioned image frames.

In one embodiment of the present invention, a method of processing television content metadata is implemented in a communications system. The system includes a consumer device in communication with an auxiliary display device. The auxiliary display device receives metadata associated with a broadcast television channel video image signal from the consumer device. In response to detecting a predefined indicator in the metadata, the auxiliary display device sends an image frame request signal to the consumer device. In response to the image frame request signal, the consumer device captures a single video image frame of the broadcast television channel video signal. The consumer device sends the single video image frame to the auxiliary display device for display thereon.

BRIEF DESCRIPTION OF THE DRAWINGS

The following detailed description of preferred embodiments of the present invention would be better understood when read in conjunction with the appended drawings. For the purpose of illustrating the present invention, there are shown in the drawings embodiments which are presently preferred. However, the present invention is not limited to the precise arrangements and instrumentalities shown. In the drawings.

DETAILED DESCRIPTION OF THE INVENTION

The present invention uses an internet appliance that has access to ATVEF data to display a "snapshot" of the current broadcast television channel video image in place of the defined "tv:" URL (real-time broadcast television channel video image).

Internet appliances that process and display ATVEF data may be required to display broadcast television channel video images at designated locations and may be required to utilize the broadcast television channel video image as a reference to an image map. These same devices may not have the means to reproduce and/or receive the broadcast television channel video image. Thus, the device will normally display nothing at all on the allocated portion of the screen, which results in a very undesirable ATVEF experience and thus takes away from the experience of the device.

This invention is a technical advancement in that it allows devices that have the means to receive ATVEF data but not reproduce and/or receive broadcast television channel video images to substitute the broadcast television channel video image with a "snapshot" of the image, which was taken by a tuner that is "connected" (either wired or wirelessly) to the device.

Internet appliances have access to ATVEF data but may not have the means to receive and/or reproduce the broadcast television program audio/video associated with the data. In instances where the ATVEF data specifies that the broadcast television channel be displayed, the internet appliance will be enabled to display a snapshot of the current broadcast television channel video image, which will be supplied by the television and/or set-top terminal to the internet appliance.

Figure 1:
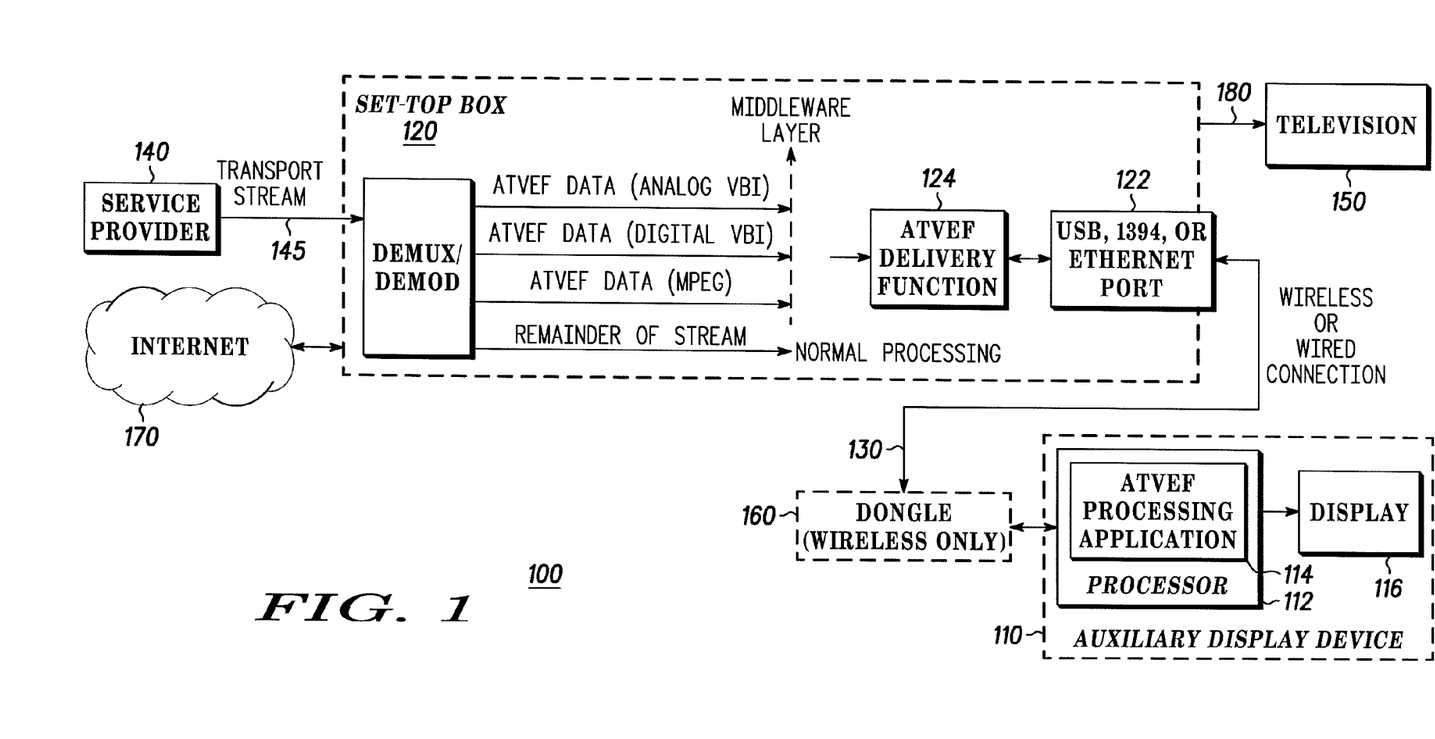
FIG. 1 is a block diagram of a communications system operating in accordance with the present invention.

FIG. 1 shows a communications system 100 including an auxiliary display device 110 (an Internet appliance) that communicates with an STB 120 via path 130. Communication system 100 is disclosed in detail in co-pending patent application Ser. No. 10/081,947 filed on Feb. 20, 2002, entitled "Method and Apparatus for Processing ATVEF Data to Control the Display of Text and Images," which is incorporated by reference in its entirety herein.

The auxiliary display device 110 includes a processor 112 which executes a television content metadata (e.g., ATVEF) processing application 114. The auxiliary display device 110 also includes a display 116. STB 120 is used by a subscriber of video services from service provider 140. Content provided by service provider 140 is presented on television 150 via STB 120 and path 180. Path 130 may be a wired or wireless connection. The wireless connection utilizes an external port 122 of STB 120, such as a universal serial bus (USB), Ethernet, or IEEE 1394 port equipped with a dongle 160 (e.g., a wireless local area network (WLAN)). A dongle is a device used for ensuring that only authorized users can copy or use specific software applications. The dongle 160 is used to support wireless connectivity between STB 120 and auxiliary display device 110. The auxiliary display device 110 may access Internet 170 via STB 120. The auxiliary display device 110 may also be connected directly to a high-speed cable modem, digital subscriber (DSL) modem or any other high-speed Internet connection device to access the Internet 170. The wireless connection could be either HomeRF® or IEEE 802.11. A more traditional wired connection would simply include a cable or wire between STB 120 and auxiliary display device 110, again, using a USB, Ethernet, or IEEE 1394 port.

The STB 120 includes an ATVEF delivery function 124 which receives enhanced content/metadata from service provider 140 via a transport stream 145. ATVEF delivery function 124 is configured to perform the following functions:

(1) Pass-through all ATVEF data to the auxiliary display device 110 for processing (analog ATVEF, VBI line 21 data, and VBI lines 10 through 21 data);

(2) Pass-through content and triggers to the auxiliary display device 110 for processing (ATVEF over MPEG);

(3) Selectively process certain ATVEF and television content metadata locally for display on the television 150, before passing through the remaining data to the auxiliary display device 110; and (4) For the processing of a primary data service, displaying optional video and audio content, when present, on television 150 or the auxiliary display device 110 such that all data is routed to the auxiliary display device 110 for processing.

Figure 2:
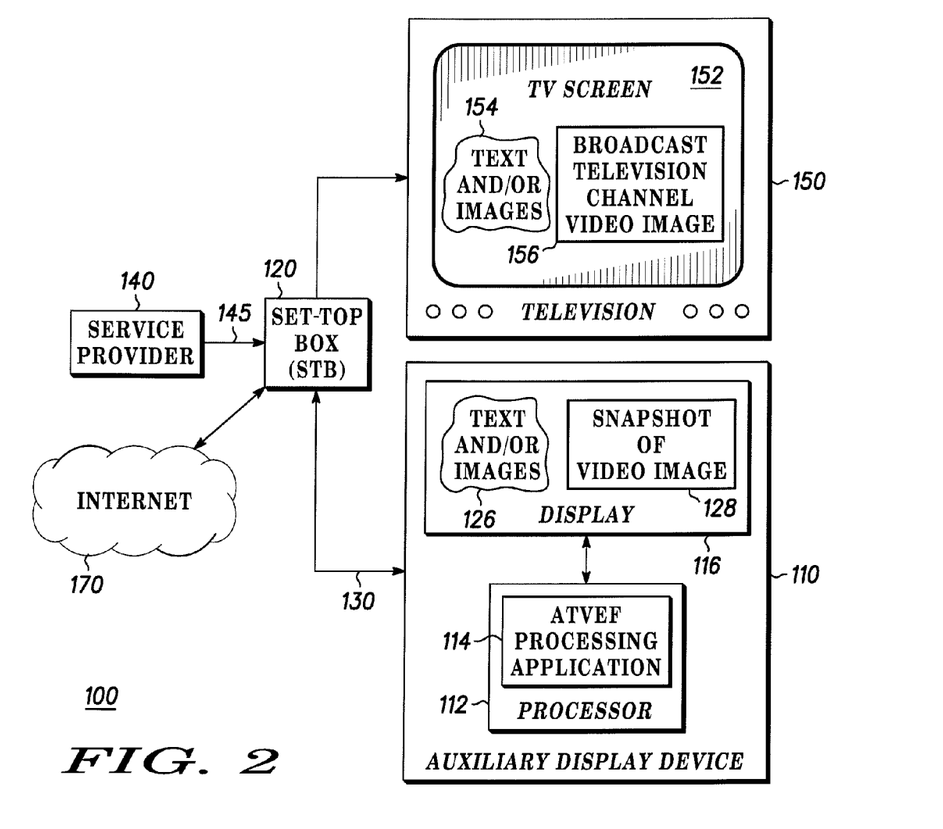
FIG. 2 shows how display space is allocated for presenting text and/or images, including a snapshot of a broadcast television channel video image, in the communications system of FIG. 1.

FIG. 2 shows how television content metadata extracted from transport stream 145 is used to configure text and/or images on a screen 152 of television 150 and the display 116 of auxiliary display device 110. The television content metadata includes a uniform resource identifier (URI) that requires that a broadcast television channel video image be presented in a designated location. For example, the television 150, which has access to the video image, displays the broadcast television channel video image at location 156 on screen 152. At the same time, text and/or other images may be displayed at location 154 on screen 152 of television 150. The auxiliary display device 110, which does not have access to the video image, displays a "snapshot" of the broadcast television channel video image 156 on display 116 of the auxiliary display device 110. The same text and/or images shown at location 154 on screen 152 of television 150 may also be shown at location 126 on display 116 of the auxiliary display device 110.

The auxiliary display device 110 presents the snapshot in an area of display 116 designated by the metadata as being reserved for a broadcast television channel video image. The television 150 presents a broadcast television channel video image adjacent to the text and/or images defined by the metadata.

A key functionality of the ATVEF Delivery Function 124 of STB 120 is the packetization of raw ATVEF content metadata received from transport stream 145 on VBI line 21. The ATVEF content metadata is carried on VBI line 21 using a Text-2 (T-2) service. The ATVEF content metadata is configured to include at least one uniform resource locator (URL). The ATVEF content metadata is extracted from the VBI via the ATVEF Delivery Function 124. Once extracted, the ATVEF Delivery Function 124 will verify that the metadata is ATVEF.

The ATVEF metadata defines text and/or images displayed on the auxiliary display device 110 and/or the television 150. The images may include static video images, full 30 frames per second MPEG-2 video, or the like. The ATVEF metadata may also define audio, animation (e.g., Flash™, Shockwave®, or the like), video clip or any other type of media that can be presented from Internet content.

Television 150 and/or STB 120 are part of a communications system 100 that processes television content metadata. Communications system 100 is capable of receiving television content metadata (e.g., ATVEF data), capturing broadcast television channel video image, and transmitting the metadata and captured broadcast television channel video image to other devices via a wired and/or wireless link. The wired link may consist of an Ethernet, USB, IEEE 1394 port (e.g., FireWire) or any other wired data transfer protocol, which are well known to those familiar with the art. The wireless link may consist of an 802.11, HomeRF, IRdA or any other wireless data transfer protocol, which are well known to those familiar with the art. The communications system 100 also includes an auxiliary display device 110 that is capable of receiving a broadcast television channel video signal and ATVEF data. The ATVEF data may contain a URL that requires that a broadcast television channel video image be displayed in a designated location. The television 150, which has access to the video image, will display the image. The auxiliary display device 110, which does not have access to the video image, will display a "snapshot" of the broadcast television channel video image at the designated location, in accordance with the present invention. The "snapshot" of the broadcast television channel video image will be supplied by the television 150 and/or STB 120. The "snapshot" may be supplied on demand or passed to the auxiliary display device 110 with the ATVEF data.

The television 150 and/or STB 120 will do one of two things. Firstly, any received ATVEF data will be parsed for "tv:" URLs. If a "tv:" URL is found, then the television 150 and/or STB 120 will capture an image of the video image currently being processed for display on the television 150. Secondly, the television 150 and/or STB 120 will wait for a request from the auxiliary display device 110, which is sent when the auxiliary display device 110 processes ATVEF data that specifies a "tv:" URL. On receipt of the request, the television 150 and/or STB 120 will capture an image of the image currently being processed for display on the television. For MPEG-2 video, the television 150 and/or STB 120 can capture a snapshot by extracting an MPEG-2 video I-frame from an MPEG-2 processor and convert the image into a well-known image frame format and apply the appropriate extension to the image file name. Examples of well-know image formats include a Joint Photographic Experts Group (JPEG) format, a Tagged Image File Format (TIFF), Graphic Interchange File Format (GIFF), Portable Network Graphics (PNG) format, Encapsulated PostScript File (EPSF) format, a bitmap graphics file format (e.g., Windows BMP), and an object oriented graphics file format (e.g., Macintosh PICT).

For analog video, the television 150 and/or STB 120 will request that the video processor present the current data to a secondary processor that will translate the data into a well-known image format (e.g., JPEG) of the current video data being processed for display and apply the appropriate extension to the image file name (e.g., "jpg").

As an example, STB 120 receives the following ATVEF data:

```
<HTML>
<HEAD>
<TITLE></TITLE>
<BODY bgcolor = #999999>
<TABLE>
<TR>
<TD align=TOP>
<A href = "http://www.somewebsite.com">
<IMG name = "SomeWebSite.com" src =
"http:/www.somewebsite.com/images/image1.gif"></A><BR>
<A href = "http://www.anotherwebsite.com">
<IMG name = "AnotherWebSite.com" src =
"http://www.anotherwebsite.com/images/image1.gif"></A>
</TD>
<TD>
<A href = "tv:"><IMG name = "surfer_TV" src = "tv:"></A>
</TD>
</TR>
<TR>
<TD colspan=2>
<A href = "http//www.wind-surfer-dude.com">
<center> To find out more about wind-surfing click here. </center></A>
</TR>
</TABLE>
</BODY>
</HTML>
```

Figure 3:
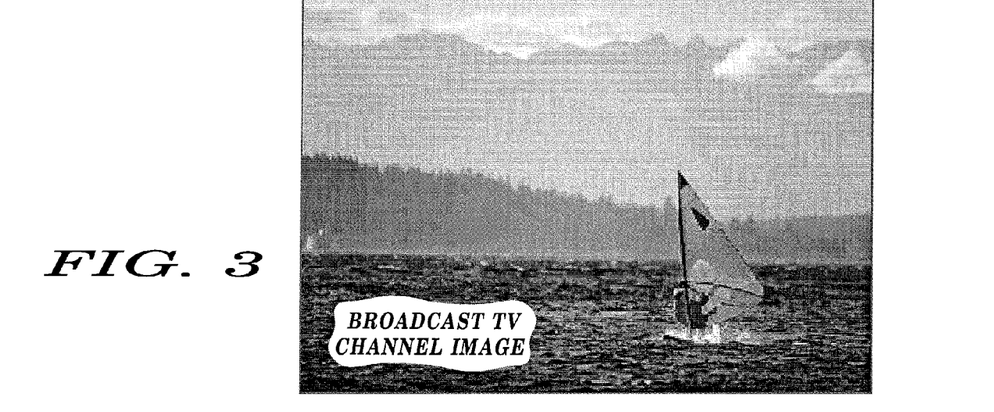
FIG. 3 shows an example of a broadcast television channel video image used to implement the present invention.

The STB 120 parses the data and locates a "tv:" URL. The STB 120 takes a snapshot of the currently tuned broadcast television channel video image (see FIG. 3). For example, the STB 120 converts the video image to a JPEG image format, and gives the image a file name "surfer_TV.jpg". The STB 120 reformats the "tv:" HTML data ("<A href="tv:"><IMG name="surfer_TV" src="tv:"></A>") to replace the "tv:" image reference with the snapshot image reference ("<A href="tv:"><IMG name="surfer_tv" src="surfer_TV.jpg"></A>").

Figure 4:
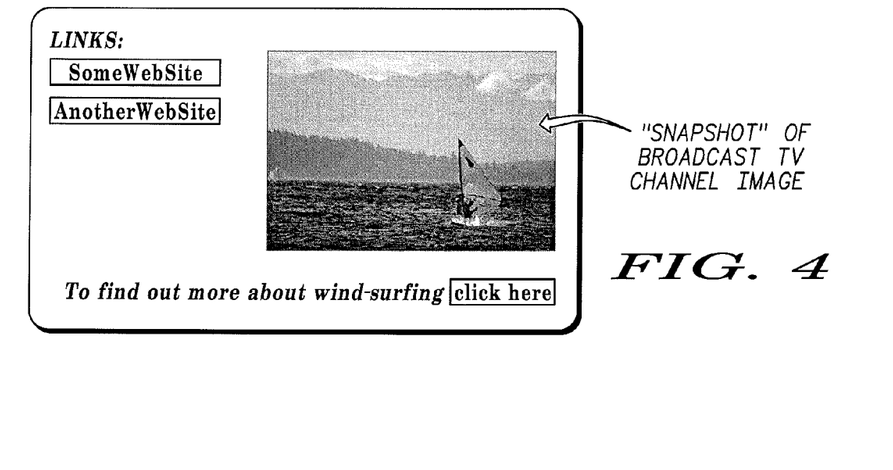
FIG. 4 shows ATVEF data, including a snapshot of the broadcast television channel video image of FIG. 3.

On receipt of the ATVEF data, the auxiliary display device 110 creates an HTML display and substitutes the "tv:" URL image with the image provided by the STB 120. FIG. 4 shows an example of the HTML display on the auxiliary display device 110.

The reformatted ATVEF will look as follows:

```
<HTML>
<HEAD>
<TITLE></TITLE>
<BODY bgcolor = #999999>
<TABLE>
<TR>
<TD align=TOP>
<A href = "http://www.somewebsite.com">
<IMG name = "SomeWebSite.com" src =
"http:/www.somewebsite.com/images/image1.gif"></A><BR>
<A href = "http://www.anotherwebsite.com">
<IMG name = "AnotherWebSite.com" src =
"http://www.anotherwebsite.com/images/image1.gif"></A>
</TD>
<TD>
<A href = "tv:"><IMG name = "surfer_TV" src = "surfer_TV.gif"></A>
</TD>
</TR>
<TR>
<TD colspan=2>
<A href = "http//www.wind-surfer-dude.com">
<center> To find out more about wind-surfing click here. </center></A>
</TR>
</TABLE>
</BODY>
</HTML>
```

In another example, the auxiliary display device 110 receives ATVEF data, parses the HTML data and detects the "<A href="tv:"><IMG name="surfer_TV" src="tv:"></A>" data. The auxiliary display device 110 then sends a message to the STB 120 requesting that the STB 120 take a snapshot of the currently tuned broadcast television channel video image. In response to the message, the STB 120 takes a snapshot of the currently tuned broadcast television channel video image, converts the image to a well-known format (e.g., GIF), and sends the image to the auxiliary display device 110. On receipt of the image, the auxiliary display device 110 processes and displays the ATVEF data, and replaces the "tv:" image reference associated with the IMG tag with the image supplied by the STB 120.

Figure 5:
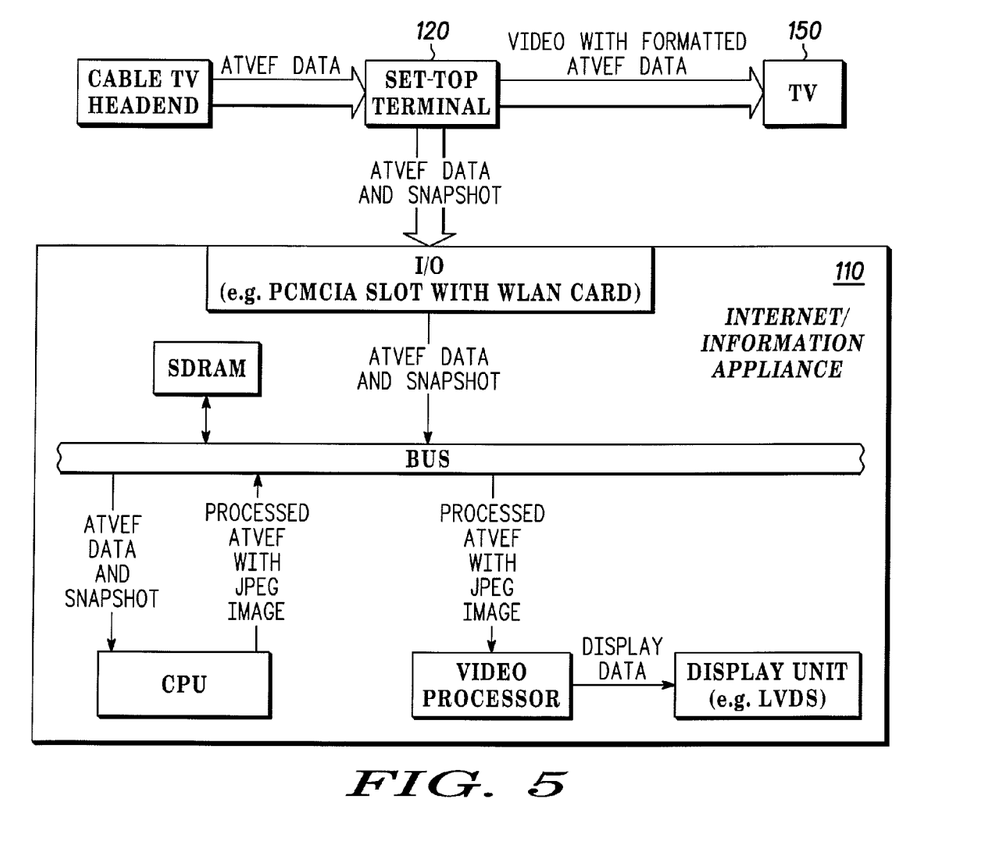
FIG. 5 shows a detailed block diagram of the communications system including components used to implement the ATVEF reformatting and display process in accordance with the present invention.

FIG. 5 shows a block diagram of the communications system 100 using the STB 120 as the device for taking the snapshots of the broadcast television channel video image.

Figure 6:
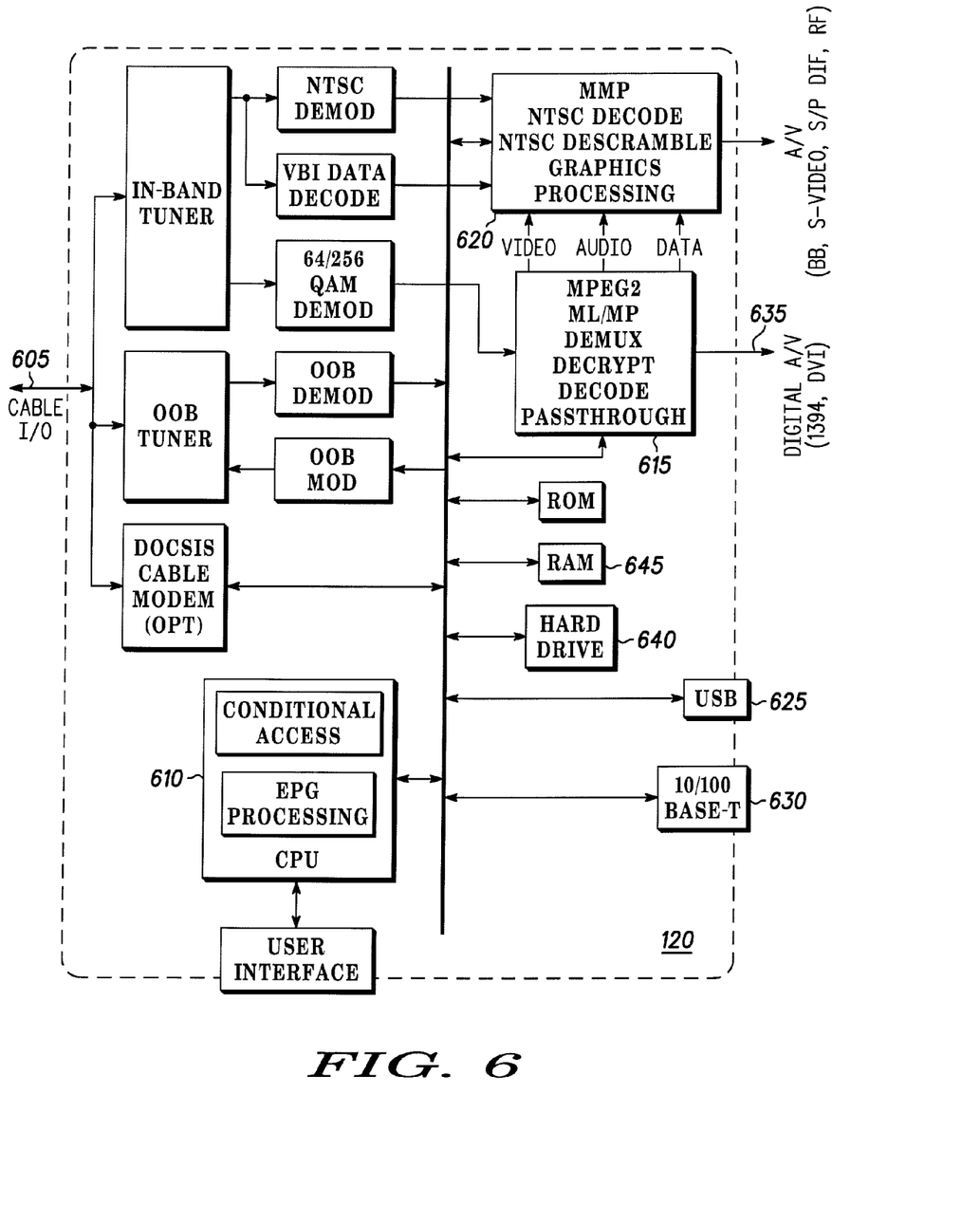
FIG. 6 shows a detailed block diagram of a set-top box used in the communications system of FIG. 1.

FIG. 6 shows a detailed block diagram of STB 120. The STB 120 receives ATVEF data via cable I/O 605 and processes the ATVEF data with CPU 610. The STB 120 takes a snapshot of a broadcast television channel video image utilizing an MPEG-2 decoder 615 for digital programs, and a Multimedia Processor (MMP) 620 for analog programs. The STB 120 communicates with the auxiliary display device 110 via Universal Serial Bus (USB) 625, 10/100 Base-T 630, or IEEE 1394 port 635. The snapshot may be stored in hard drive 640 and/or Random Access memory (RAM) 645.

Figure 7:
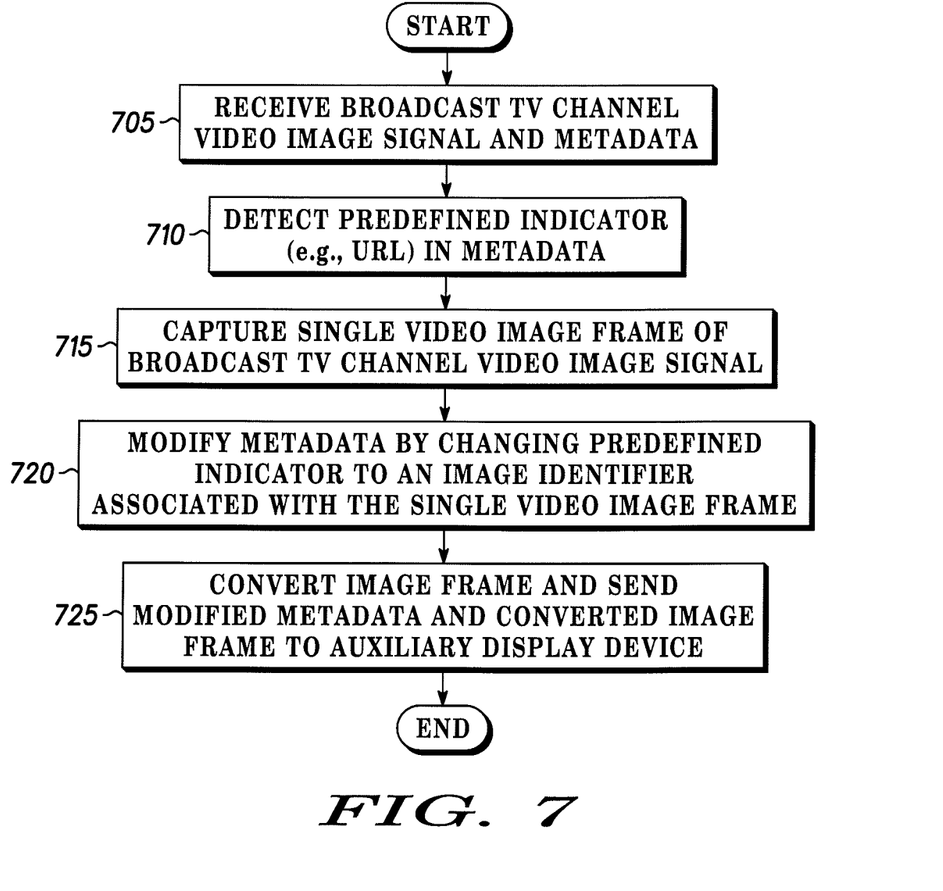
FIG. 7 is a flow chart including method steps for processing television content metadata according to a preferred embodiment of the present invention.

FIG. 7 is a flow chart that shows the steps of a method of processing television content metadata in communications system 100, in accordance with a preferred embodiment of the present invention. In step 705, a broadcast television channel video image signal and the metadata are received by a consumer device (e.g., STB 120 and/or television 150). In step 710, a predefined indicator is detected in the metadata. In response, a single video image frame of the broadcast television channel video image signal is captured by the consumer device (step 715). The consumer device is in communication with an auxiliary display device 110. In step 720, the metadata is modified by changing the predefined indicator to an image identifier associated with the single video image frame. In step 725, the single video image frame is converted to a well-known format and the consumer device sends the modified metadata and the converted single video image frame to the auxiliary display device 110 for display thereon (step 725). The single video image frame may be a Moving Picture Experts Group (MPEG) image frame, which is converted to one of a Joint Photographic Experts Group (JPEG) image frame, a Tagged Image File Format (TIFF) image frame, a Graphic Interchange File Format (GIFF) image frame, a Portable Network Graphics (PNG) image frame, an Encapsulated PostScript File (EPSF) image frame, a bitmap graphics file image frame (e.g., Windows BMP), and an object oriented graphics file image frame (e.g., Macintosh PICT).

Figure 8:
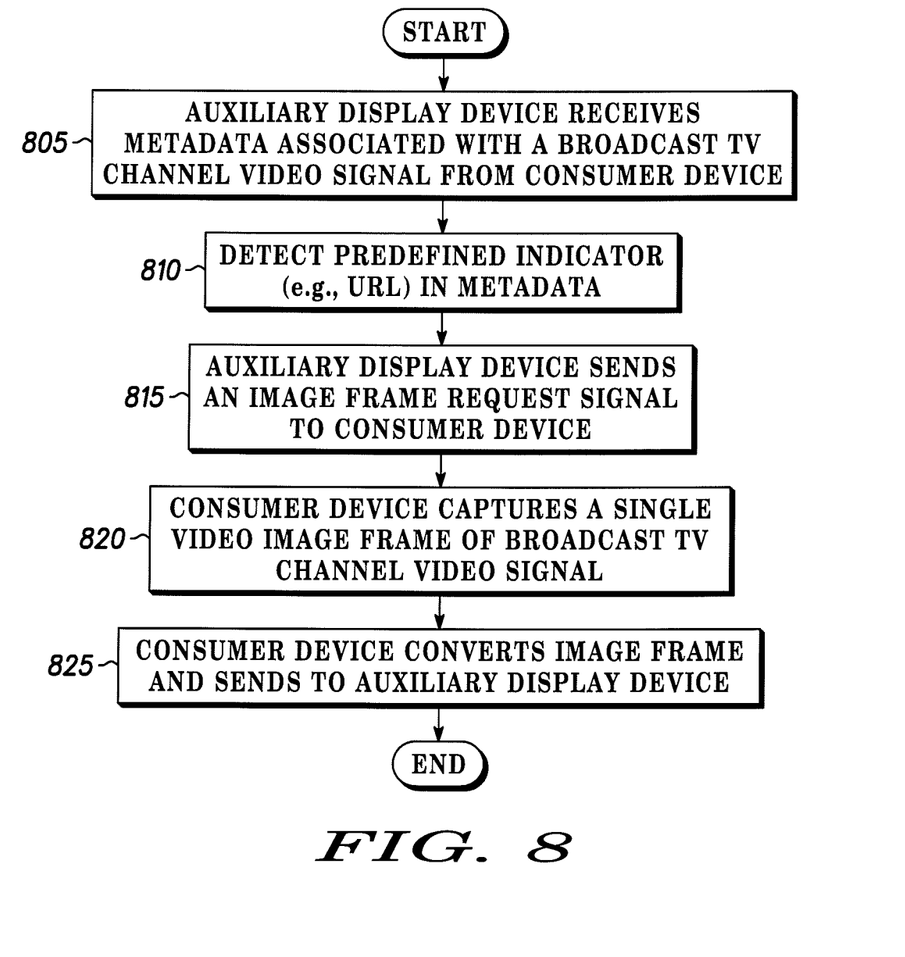
FIG. 8 is a flow chart including method steps for processing television content metadata according to another embodiment of the present invention.

FIG. 8 is a flow chart that shows the steps of a method of processing television content metadata in communications system 100, in accordance with one embodiment of the present invention. In step 805, the auxiliary display device 110 receives metadata associated with a broadcast television channel video image signal from a consumer device (e.g., STB 120 and/or television 150). In step 810, a predefined indicator is detected in the metadata. In response, the auxiliary display device 110 sends an image frame request signal to the consumer device (step 815). In response to the image frame request signal, the consumer device captures a single video image frame of the broadcast television channel video signal (step 820). In step 825, the consumer device converts the single video image frame to a well-known format and the consumer device sends the modified metadata and the converted single video image frame to the auxiliary display device 110 for display thereon.

The present invention may be implemented with any combination of hardware and software. If implemented as a computer-implemented apparatus, the present invention is implemented using means for performing all of the steps and functions described above.

The present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A method of processing television content metadata in a communications system, the system including a consumer device in communication with an auxiliary display device, the method comprising:
   (a) the auxiliary display device receiving metadata associated with a broadcast television channel video image signal from the consumer device;
   (b) in response to detecting a predefined indicator in the metadata, the auxiliary display device automatically sending an image frame request signal to the consumer device;
   (c) in response to the image frame request signal, the consumer device capturing a single video image frame of the broadcast television channel video signal; and
   (d) the consumer device sending the single video image frame to the auxiliary display device for display thereon.

2. The method of claim 1 wherein the consumer device is a set-top box (STB).

3. The method of claim 1 wherein the consumer device is a television.

4. The method of claim 1 wherein the predefined indicator is a "tv:" uniform resource locator (URL).

5. The method of claim 1 wherein the metadata includes advanced television enhancement forum (ATVEF) data.

6. The method of claim 1 wherein the single video image frame is a Moving Picture Experts Group (MPEG) image frame, and step (c) further comprises the consumer device converting the MPEG image frame to a Joint Photographic Experts Group (JPEG) image frame.

7. The method of claim 1 wherein the single video image frame is a Moving Picture Experts Group (MPEG) image frame, and step (c) further comprises converting the MPEG image frame to a Tagged Image File Format (TIFF) image frame.

8. The method of claim 1 wherein the single video image frame is a Moving Picture Experts Group (MPEG) image frame, and step (c) further comprises converting the MPEG image frame to a Graphic Interchange File Format (GIFF) image frame.

9. The method of claim 1 wherein the single video image frame is a Moving Picture Experts Group (MPEG) image frame, and step (c) further comprises converting the MPEG image frame to a Portable Network Graphics (PNG) image frame.

10. The method of claim 1 wherein the single video image frame is a Moving Picture Experts Group (MPEG) image frame, and step (c) further comprises converting the MPEG image frame to an Encapsulated PostScript File (EPSF) image frame.

11. The method of claim 1 wherein the single video image frame is a Moving Picture Experts Group (MPEG) image frame, and step (c) further comprises converting the MPEG image frame to a bitmap graphics file image frame.

12. The method of claim 1 wherein the single video image frame is a Moving Picture Experts Group (MPEG) image frame, and step (c) further comprises converting the MPEG image frame to an object oriented graphics file image frame.

* * * * *